US009066062B2

(12) United States Patent
Otani (10) Patent No.: US 9,066,062 B2
(45) Date of Patent: Jun. 23, 2015

(54) ELECTRONIC APPARATUS FOR PROCESSING MOVING IMAGE DATA

(71) Applicant: CASIO COMPUTER CO., LTD., Shibuya-ku, Tokyo (JP)

(72) Inventor: Daisuke Otani, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 94 days.

(21) Appl. No.: 14/054,373

(22) Filed: Oct. 15, 2013

(65) Prior Publication Data
US 2014/0112645 A1 Apr. 24, 2014

(30) Foreign Application Priority Data

Oct. 22, 2012 (JP) ................... 2012-232795

(51) Int. Cl.
  H04N 5/932 (2006.01)
  H04N 5/935 (2006.01)
  H04N 9/80 (2006.01)
  H04N 9/804 (2006.01)
  G11B 20/10 (2006.01)
  H04N 5/783 (2006.01)
  H04N 5/907 (2006.01)
  H04N 5/91 (2006.01)

(52) U.S. Cl.
  CPC ........ *H04N 9/8042* (2013.01); *G11B 20/10527* (2013.01); *H04N 5/907* (2013.01); *H04N 5/91* (2013.01); *G11B 2020/10537* (2013.01); *G11B 2020/10675* (2013.01); *H04N 5/783* (2013.01)

(58) Field of Classification Search
  USPC .................................. 386/222, 248, 314, 326
  See application file for complete search history.

(56) References Cited

U.S. PATENT DOCUMENTS

| 6,957,181 | B1 | 10/2005 | Verbakel et al. |
| 7,529,160 | B2 | 5/2009 | Gotoh et al. |
| 2001/0026675 | A1* | 10/2001 | Schultz et al. ................. 386/68 |
| 2002/0065969 | A1* | 5/2002 | Schultz ........................ 710/260 |
| 2003/0223494 | A1* | 12/2003 | Kurauchi ................. 375/240.08 |

(Continued)

FOREIGN PATENT DOCUMENTS

| JP | 09051505 A | 2/1997 |
| JP | 10-285550 A | 10/1998 |

(Continued)

OTHER PUBLICATIONS

Japanese Office Action dated Jan. 19, 2015, issued in counterpart Japanese Application No. 2012-232795.

(Continued)

*Primary Examiner* — Nigar Chowdhury
(74) *Attorney, Agent, or Firm* — Holtz, Holtz, Goodman & Chick PC (57) ABSTRACT

An electronic apparatus of the present invention includes a reading section which reads moving image data stored in an external storage medium by one of a plurality of reading methods, and a decoding section which decodes the moving image data read by the reading section, in which a decoding speed at which the moving image data is decoded by the decoding section and a reading speed at which the moving image data is read by the reading section are identified, and a reading method that is used when the reading section reads the moving image data is selected based on whether the identified decoding speed and the identified reading speed identified are in a predetermined relationship.

11 Claims, 6 Drawing Sheets

(56) References Cited

U.S. PATENT DOCUMENTS

| | | |
|---|---|---|
| 2005/0068819 A1 | 3/2005 | Gotoh et al. |
| 2005/0281140 A1 | 12/2005 | Verbakel et al. |
| 2007/0165999 A1* | 7/2007 | Nishikawa et al. ............ 386/68 |
| 2007/0269181 A1* | 11/2007 | Kikuchi .......................... 386/68 |
| 2007/0292110 A1* | 12/2007 | Nishi et al. ..................... 386/92 |
| 2010/0100635 A1 | 4/2010 | Takemura et al. |

FOREIGN PATENT DOCUMENTS

| | | |
|---|---|---|
| JP | 2005235170 A | 9/2005 |
| JP | 2007-228502 A | 9/2007 |
| JP | 2010098526 A | 4/2010 |
| KR | 1020010022774 A | 3/2001 |
| KR | 1020040044527 A | 5/2004 |
| KR | 100630943 B1 | 9/2006 |
| WO | 9965026 A2 | 12/1999 |

OTHER PUBLICATIONS

Korean Office Action dated Nov. 26, 2014, issued in counterpart Korean Application No. 10-2013-0124539.

* cited by examiner

ELECTRONIC APPARATUS FOR PROCESSING MOVING IMAGE DATA

CROSS-REFERENCE TO RELATED APPLICATION

This application is based upon and claims the benefit of priority from the prior Japanese Patent Application No. 2012-232795, filed Oct. 22, 2012, the entire contents of which are incorporated herein by reference.

BACKGROUND OF THE INVENTION

1. Field of the Invention

The present invention relates to an electronic apparatus for processing moving image data, a moving image playback apparatus, a moving image decoding method and a program (storage medium)

2. Description of the Related Art

In recent years, in addition to digital cameras, electronic apparatuses with a camera function, such as portable phones, smart phones, and tablet terminals, generally include a moving image photograph function in which captured moving images are compressed with the use of a codec such as H. 264 and stored in an external storage medium (SD card (registered trademark), micro SD card (registered trademark), and Compact Flash Card (registered trademark)), and a moving image playback function in which stored moving image data is read out, decoded, and replayed.

In these electronic apparatuses, when stored moving image data is to be replayed, streaming is performed such that the moving image data is sequentially decoded and replayed while being read. However, there is a disadvantage in that a playback speed lags in the case of reverse playback due to the presence frames including a P frame which cannot individually be decoded.

Also, these electronic apparatuses are known for their functions of simultaneously replaying two moving images for the purpose of, for example, comparing athletic forms in sports. However, it is difficult to simultaneously stream and replay two moving images due to the limited number of decoder resources and a processing time in a camera.

Accordingly, there is a technology in which, when stored moving image data is to be played back, it is buffered to an internal memory once and then decoded and converted into display data, and the display data is replayed. For example, as conventional technologies, there have been disclosed playback apparatuses in which an optical disk is used as an external storage medium, and there has been proposed a technology in which moving image data and audio data read from an optical disk are stored in a buffer once, and then decoded and outputted (for example, see Japanese Patent Application Laid-Open (Kokai) Publication No. 10-285550).

SUMMARY OF THE INVENTION

In accordance with one aspect of the present invention, there is provided an electronic apparatus comprising: a reading section which reads moving image data stored in an external storage medium by one of a plurality of reading methods; a decoding section which decodes the moving image data read by the reading section; an identifying section which identifies a decoding speed at which the moving image data is decoded by the decoding section and a reading speed at which the moving image data is read by the reading section; and a selecting section which selects a reading method that is used when the reading section reads the moving image data, based on whether the decoding speed and the reading speed identified by the identifying section are in a predetermined relationship.

In accordance with another aspect of the present invention, there is provided a decoding method comprising: a reading step of reading moving image data stored in an external storage medium by one of a plurality of reading methods; a decoding step of decoding the moving image data read in the reading step; an identifying step of identifying a decoding speed at which the moving image data is decoded in the decoding step and a reading speed at which the moving image data is read in the reading step; and a selecting step of selecting a reading method that is used when the moving image data is read in the reading step, based on whether the decoding speed and the reading speed identified in the identifying step are in a predetermined relationship.

In accordance with another aspect of the present invention, there is provided a non-transitory computer-readable storage medium having stored thereon a program that is executable by a computer in an electronic apparatus, the program being executable by the computer to perform functions comprising: read processing for reading moving image data stored in an external storage medium by one of a plurality of reading methods; decode processing for decoding the moving image data read by the read processing; identification processing for identifying a decoding speed at which the moving image data is decoded by the decode processing and a reading speed at which the moving image data is read by the read processing; and selection processing for selecting a reading method that is used when the moving image data is read by the read processing, based on whether the decoding speed and the reading speed identified by the identification processing are in a predetermined relationship.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Hereinafter, an embodiment of the present invention will be described referring to the drawings. The present invention selects a more appropriate buffering method in accordance with the speed of reading moving image data from an external storage medium and the speed of decoding the moving image data, and thereby achieves a more high-speed buffering. As a result, a waiting time from the instruction of playback to the start of the playback can be shortened. Note that the speed of reading moving image data from an external storage medium depends on the type and the category of the external storage medium, and the speed of decoding the moving image data depends on the codec type, the compression ratio, and the resolution of the moving image data, and the data transfer speed of an internal memory (buffer).

A. Structure of Embodiment

Figure 1:
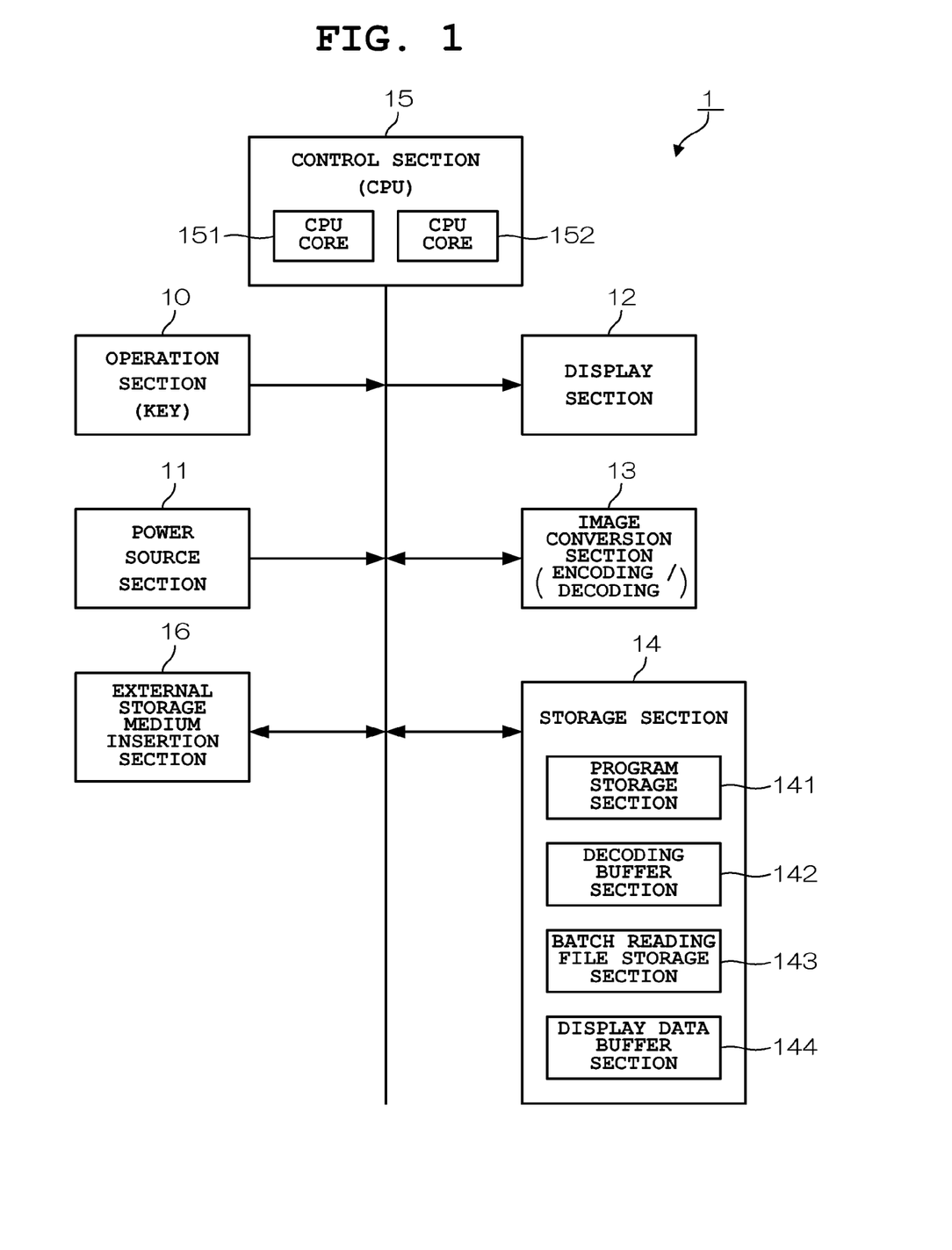
FIG. 1 is a block diagram illustrating the structure of an electronic apparatus 1 of an embodiment according to the present invention.

FIG. 1 is a block diagram illustrating the structure of an electronic apparatus 1 of an embodiment according to the present invention. In the diagram, the electronic apparatus 1 includes an operation section (key) 10, a power source section 11, a display section 12, an image conversion section 13, a storage section 14, a control section (CPU: Central Processing Unit) 15, and an external storage medium insertion section 16. Note that the electronic apparatus 1 is described on the assumption that the electronic apparatus 1 is a digital camera. In FIG. 1, only components related to a method of buffering moving image data in the embodiment of the present invention are illustrated, and other components are omitted.

The operation section (key) 10 includes a plurality of operation keys such as a shutter SW, a zoom SW, a mode key, a SET key, and a cruciform key, and outputs an operation signal corresponding to the user's key operation to the control section (CPU) 15. The power source section 11 includes a primary battery or a rechargeable secondary battery, and supplies power to each section. The display section 12 includes a color LCD (Liquid Crystal Display) and a drive circuit thereof. The display section 12 replays and displays moving image data decoded and held in a later-described display data buffer section 144, at a predetermined frame rate.

The image conversion section 13 encodes moving image data photographed by a photographing section not illustrated (for example, the encoding of moving image data into H. 264 format), and decodes moving image data read out for each respective frame from a later-described decoding buffer section 142 of the storage section 14 (for example, the restoration of moving image data compressed in H. 264 format). The decoded moving image data is stored in the display data buffer section 144 for each respective frame. Note that the image conversion section 13 is configured to perform processing for extending and contracting moving image data when decoding it, and a time during which this processing for extending and contracting moving image data is performed is included in a decoding time per one frame.

The storage section 14 includes a program storage section 141, the decoding buffer section 142, a batch reading file storage section 143, and the display data buffer section 144. The program storage section 141 is operated by the control section (CPU) 15 and stores programs required for controlling each section. The decoding buffer section 142 is a buffer which temporarily stores moving image data read out from an external storage medium inserted into the later-described external storage medium insertion section 16, in order to supply the moving image data to the image conversion section 13 which decodes the moving image data in units of one frame. The batch reading file storage section 143 is a buffer which temporarily stores moving image data collectively read out from the external storage medium inserted into the later-described external storage medium insertion section 16. The display data buffer section 144 is a buffer which sequentially holds moving image data decoded in units of one frame by the image conversion section 13. When the decoding is completed, the moving image data held by the display data buffer section 144 is read out at a predetermined frame rate and replayed and displayed on the display section 12.

External storage media such as an SD card (registered trademark), a micro SD card (registered trademark), and Compact Flash Card (registered trademark) can be inserted into the external storage medium insertion section 16. In these external storage media, by their memory structures, an access speed in the case of collective access in units of block (in units of page) is higher than that in a normal access, and moving image data compressed by a predetermined codec (for example, H. 264) is held in these external storage media.

The control section (CPU: Central Processing Unit) 15 is a so-called dual core CPU in which two CPU cores 151 and 152 are mounted. In the present embodiment two buffering methods are applied as a buffering method in decoding processing. The control section (CPU) 15 selectively switches the buffering methods in accordance with a speed at which data is read out from an external storage medium inserted into the external storage medium insertion section 16 and a speed at which moving image data is decoded by the image conversion section 13, and thereby achieves a more high-speed buffering.

Accordingly, a first buffering method is a method in which, while being read out in units of one frame from an external storage medium inserted into the external storage medium insertion section 16, moving image data is sequentially decoded in units of one frame by the image conversion section 13 and buffered to a display buffer section 14. Also, a second buffering method is a method in which moving image data is collectively read out from an external storage medium inserted into the external storage medium insertion section 16 (retained in the batch reading file storage section 143), and sequentially decoded in units of one frame by the image conversion section 13 and buffered to the display buffer section 14 while being read out from the batch reading file storage section 143 in units of one frame.

Also, in the case where moving image data is read out in units of one frame by the first buffering method, the control of access to the external storage medium is performed not by the access control in units of block (in units of page) but by normal access control. In the case where moving image data is collectively read out by the second buffering method, the control of access to the external storage medium is performed not by the normal access control but by the access control in units of block (in units of page). Accordingly, a period of time used to read a certain amount of data by the second buffering method is shorter than a period of time used to read the same amount of data by the first buffering method.

In the present embodiment, since the dual core CPU is used for the control section (CPU) 15, for example, the CPU core 151 performs processing for reading in units of one frame from an external storage medium inserted into the external storage medium insertion section 16 or batch reading processing (which includes the copying of collectively read moving image data to the decoding buffer section 142 in units of frame), and the CPU core 152 sequentially decodes the moving image data in units of one frame and performs processing for buffering the data to the display buffer section 14 (the CPU cores 151 and 152 may perform the aforementioned processing vice versa).

Figure 2:
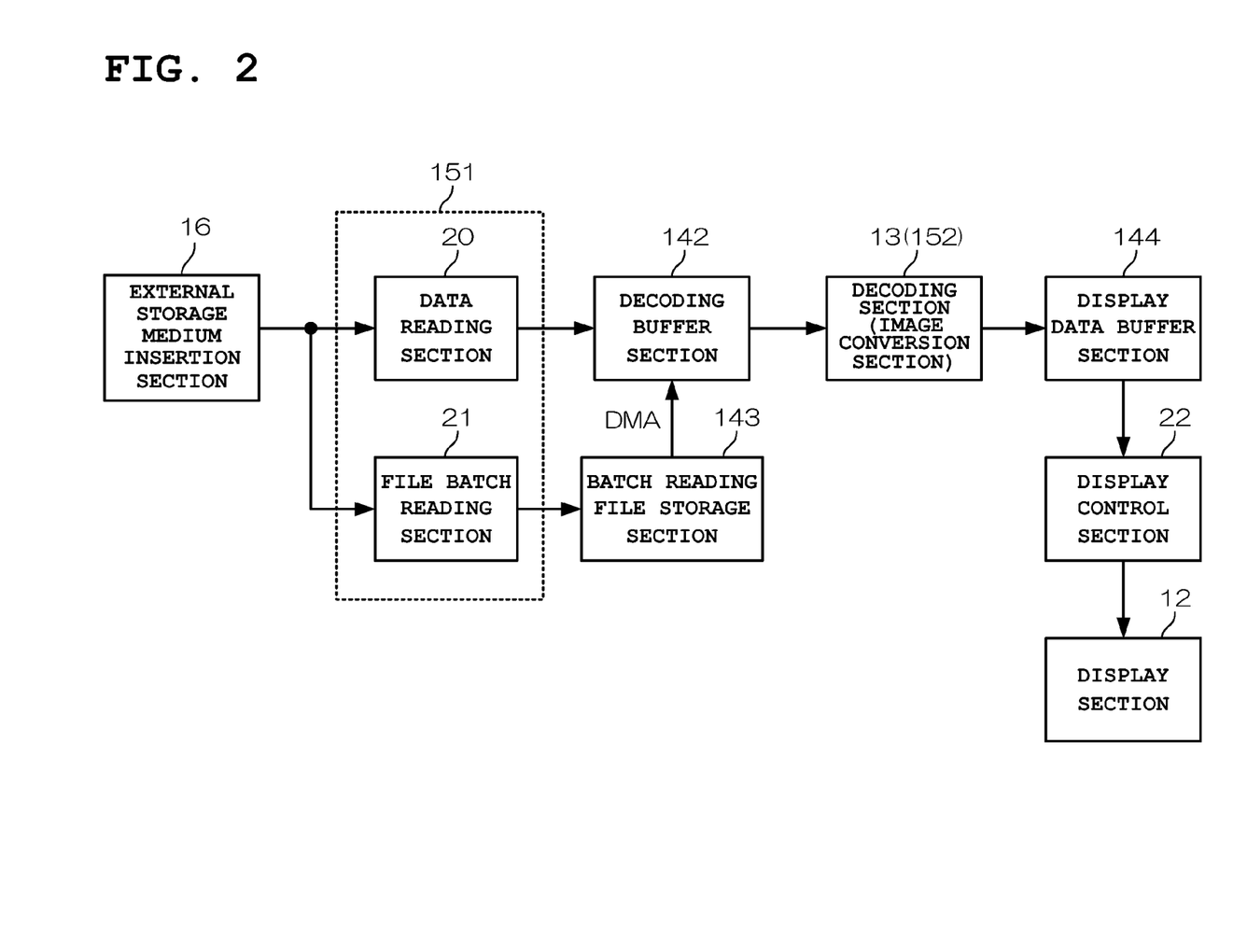
FIG. 2 is a block diagram illustrating the functional structure of the electronic apparatus 1 of the present embodiment.

FIG. 2 is a block diagram illustrating the functional structure of the electronic apparatus 1 of the present embodiment. In the diagram, sections corresponding to those in FIG. 1 are given the same reference numerals as those of FIG. 1, and therefore explanations thereof are omitted. In the case where the first buffering method has been selected, a data reading section 20 (CPU core 151) reads out moving image data in units of one frame from the external storage medium inserted into the external storage medium insertion section 16 and transmits it to the decoding buffer section 142.

The CPU core 151 can read and write data into/from various external storage media that can be inserted into the external storage medium insertion section 16, with the use of the data reading section 20 or a file batch reading section 21, and supports various access methods and access speeds which are selectable in respective external storage media.

In the case where the second buffering method has been selected, the file batch reading section 21 (CPU core 151) reads out moving image data (of a predetermined size) in units of block (in units of page) collectively from an external storage medium inserted into the external storage medium insertion section 16 and supplies it to the batch reading file storage section 143. The batch reading file storage section 143 retains moving image data (of a predetermined size) read out collectively. The moving image data is sequentially and directly transferred (copied) in units of one frame from the batch reading file storage section 143 to the decoding buffer section 142 based on DMA (Direct Memory Access).

In any of the first buffering method and the second buffering method, the decoding section (image conversion section) 13 (CPU core 152) decodes moving image data sequentially transferred to the decoding buffer section 142 in units of one frame, and sequentially buffers it to the display data buffer section 144.

For example, in a case where two pieces of moving image data are simultaneously replayed, the decoding section (image conversion section) 13 (CPU core 152) decodes the second moving image data after completing the decoding of the first moving image data. However, the present invention is not limited thereto, and the moving image data may alternately be decoded in units of block. After the completion of the decoding, the two pieces of decoded moving image data are stored in the display data buffer section 144. Then, a display control section 22 reads out the moving image data decoded and buffered to the display data buffer section 144, and replays and displays it on the display section 12 at a predetermined frame rate.

In particular, in a case where highly compressed moving image data of a high quality is replayed, the moving image data that has already been decoded is buffered to the display data buffer section 144 at the time of the playback. Accordingly, even in a case where the moving image data is reversely played back, the playback speed does not lag, and the moving image data can smoothly be played back reversely.

Also, as described above, in the case where two pieces of moving image data are simultaneously replayed, the two pieces of moving image data that have already been decoded are buffered to the display data buffer section 144 at the time of simultaneous playback. This eliminates load on the playback function, which makes it possible to smoothly play back the moving image data.

Next, conditions when switching is performed between the first buffering method and the second buffering method in the present embodiment will be described. In the present embodiment, the buffering methods are selectively switched in accordance with the speed of reading out moving image data from an external storage medium inserted into the external storage medium insertion section 16 and the speed of decoding the moving image data by the decoding section (image conversion section) 13, so that temporal data described below is retained in advance or calculated as needed.

That is, the presence or absence of a function for batch access in units of block (in units of page) and its access speed are retained in advance for each type (each category) of external storage medium that can be inserted into the external storage medium insertion section 16. Then, when an external storage media is inserted, the type of this external storage medium is identified, and the following times are calculated based on the access speed of the external storage medium of the identified type.

Also, information regarding a decoding speed is retained in advance for each type of recording status (compression ratio, resolution) of moving image data and playback condition (playback mode) of moving image data. Then, when the playback of moving image data is instructed, the recording status of the moving image data targeted for the playback and the playback mode are identified, and the following times are calculated based on the identified recording status or the playback mode.

Time T1: a decode time per one frame of moving images (inclusive of extension and contraction).

Time T2: a time during which moving image data per one frame of moving images (roughly estimated size) is read out from an external storage medium inserted into the external storage medium insertion section 16.

Time T3: a time during which moving image data (of a predetermined size) is collectively read out from an external storage medium inserted into the external storage medium insertion section 16.

Time T4: the number n of remaining decoding frames×Time T2.

Time T5: the number n of remaining decoding frames×Time T1+Time T3.

The time T2 during which moving image data of a roughly estimated size per one frame is read out and the time T3 during which moving image data of a collectively readable buffer size are measured at the time of activation or the time of selection of moving images and internally retained.

As described above, in the present embodiment, operations are performed by the dual core processors. The CPU cores 151 and 152 simultaneously perform the decoding processing and the reading processing for moving image data in parallel, thereby achieving efficient processing. Accordingly, out of the decoding processing for one frame and the reading processing for moving image data, processing that requires a longer processing time is the overhead of the entire processing.

Specifically, when the decoding time T1 is longer than the moving-image-data reading time T2, the moving-image-data reading processing per one frame is faster, and therefore the first buffering method is selected in which the moving image data is decoded and buffered while being read for every one frame. That is, since the moving-image-data reading processing is faster than the decoding processing, even when the moving image data is decoded while being read for every one frame, the decoding processing can successively be executed without waiting for the completion of the moving-image-data reading processing. Therefore, the decoding can be completed in the shortest time, which makes it possible to complete the buffering in the shortest time.

Conversely, when the decoding time T1 is shorter than the moving-image-data reading time T2, and when the time T4 (the number n of remaining decoding frames×Time T2) is longer than the time T5 (the number n of remaining decoding frames×Time T1+Time T3), the second buffering method is selected in which the file (moving image data) is collectively read, retained in the batch reading file storage section 143 once, decoded, and buffered while internally being copied to the decoding buffer section 142 in units of one frame based on DMA.

That is, since the decoding processing is faster than the moving-image-data reading processing, when the moving image data is decoded while being read for everyone frame (when the first buffering method is applied), the decoding processing is required to be in a waiting state until the reading of the moving image data of one frame is completed, which makes it impossible to execute the successive, actual decoding processing. In this case, if the batch reading time T3 is short enough to absorb a waiting time regarding the aforementioned decoding (that is, time T4>time T5), the second buffering method, in which the moving image data is collectively read out and decoded while internally being copied for every one frame, is selected, whereby the decoding is completed in a short time and the buffering is completed in the shortest time.

As such, the first buffering method and the second buffering method are selectively switched in accordance with the speed of reading out data from an external storage medium inserted into the external storage medium insertion section 16 and the decoding speed of the decoding section (image conversion section) 13. As a result, buffering can be completed in a shorter time, and a waiting time from the instruction of playback to the start of the playback can be shortened.

B. Operations of Embodiment

Figure 3:
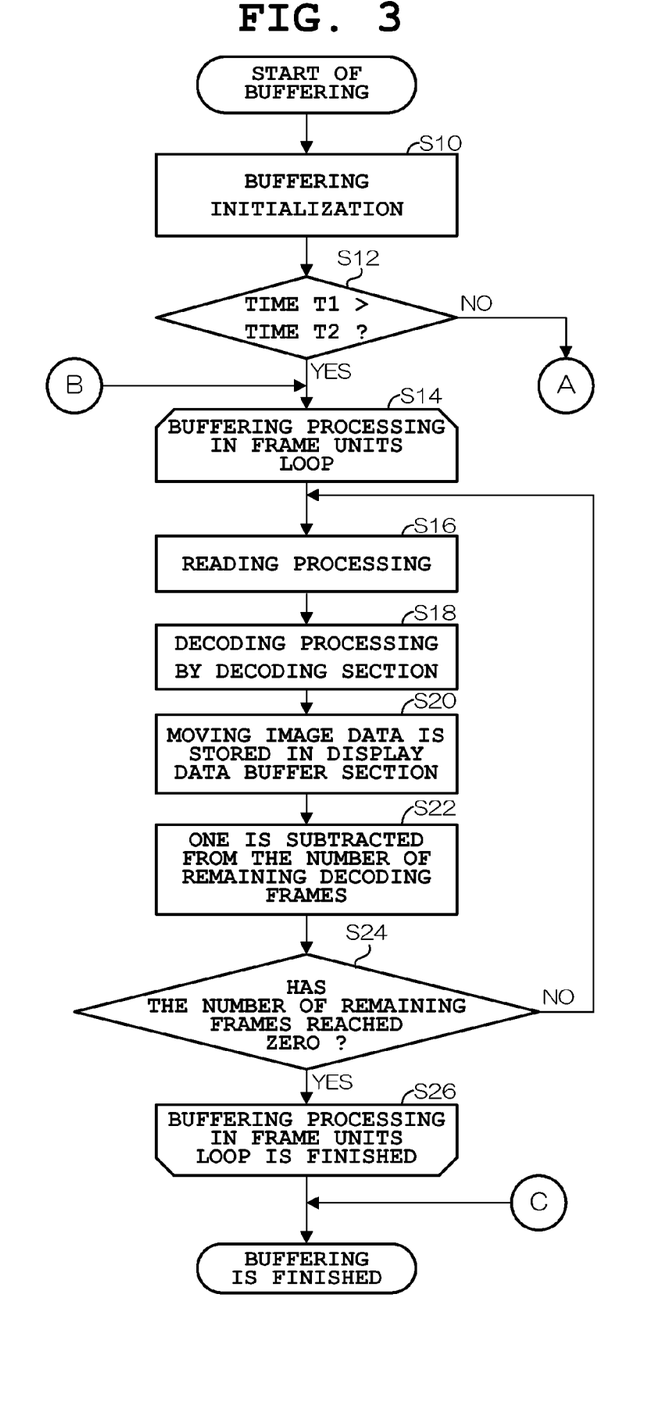
FIG. 3 is a flowchart to describe the operation of the electronic apparatus 1 of the present embodiment.
Figure 4:
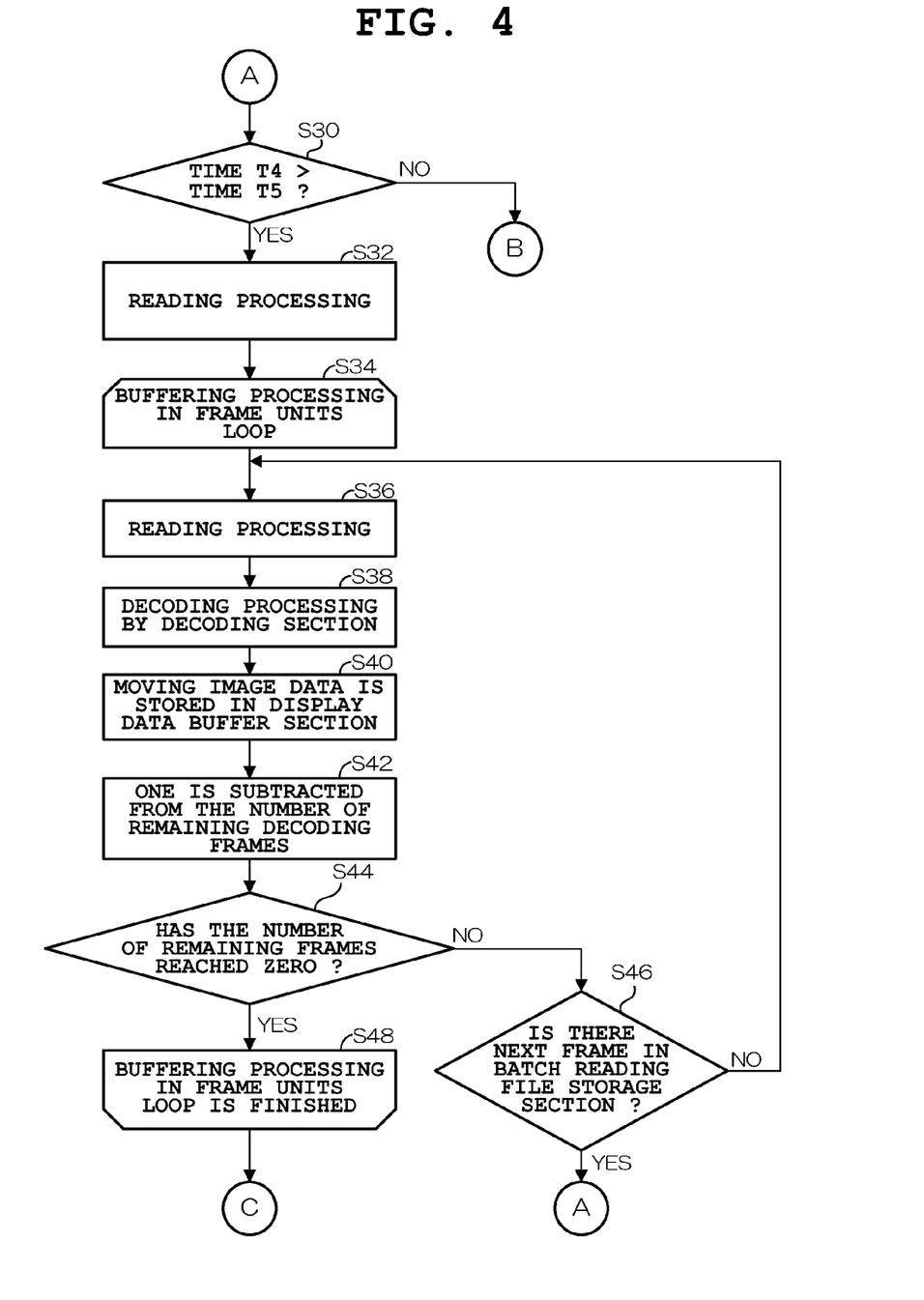
FIG. 4 is a flowchart to describe the operation of the electronic apparatus 1 of the present embodiment.
Figure 5:
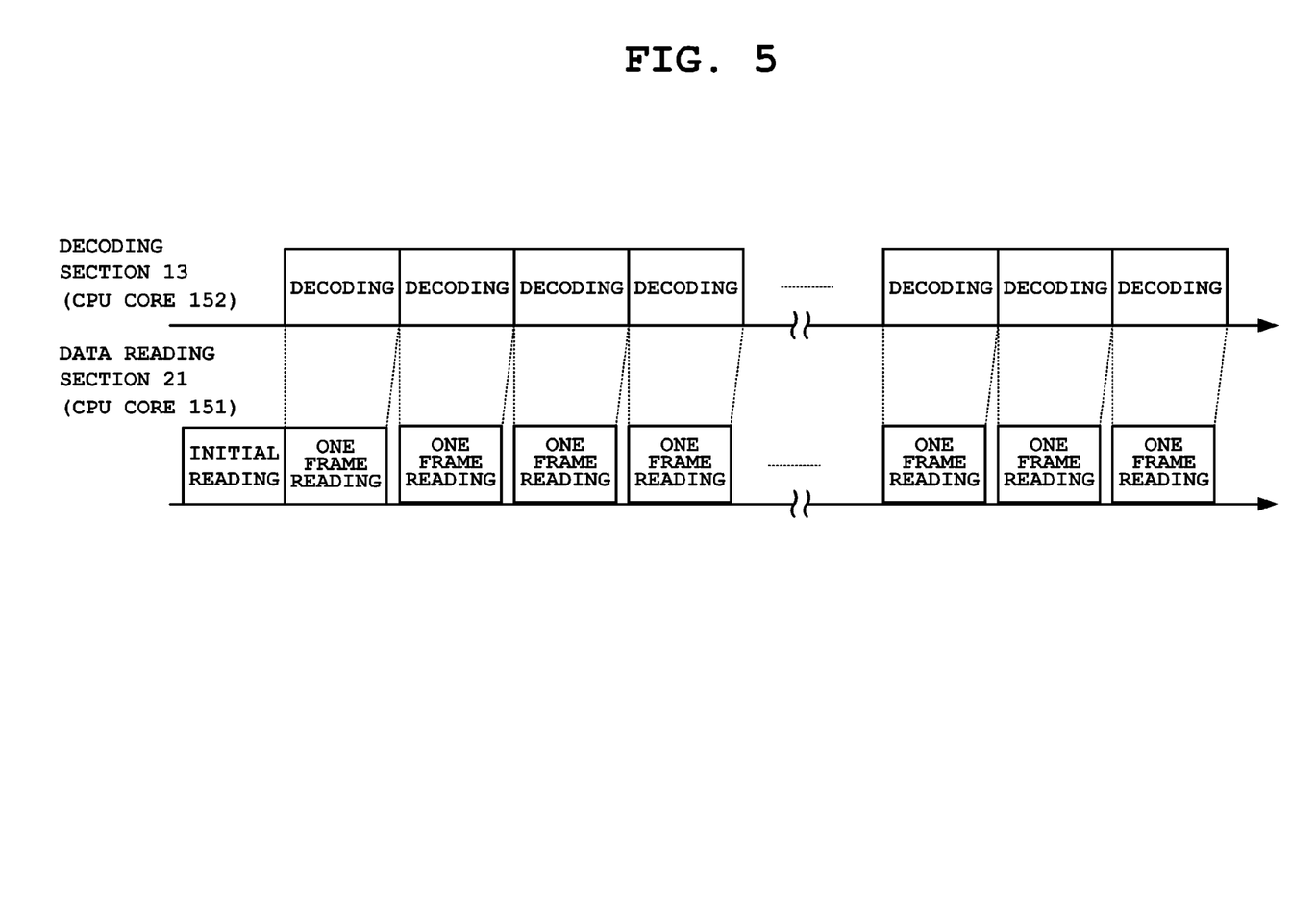
FIG. 5 is a timing chart to describe the buffering operation of moving image data of the electronic apparatus 1 of the present embodiment.
Figure 6A:
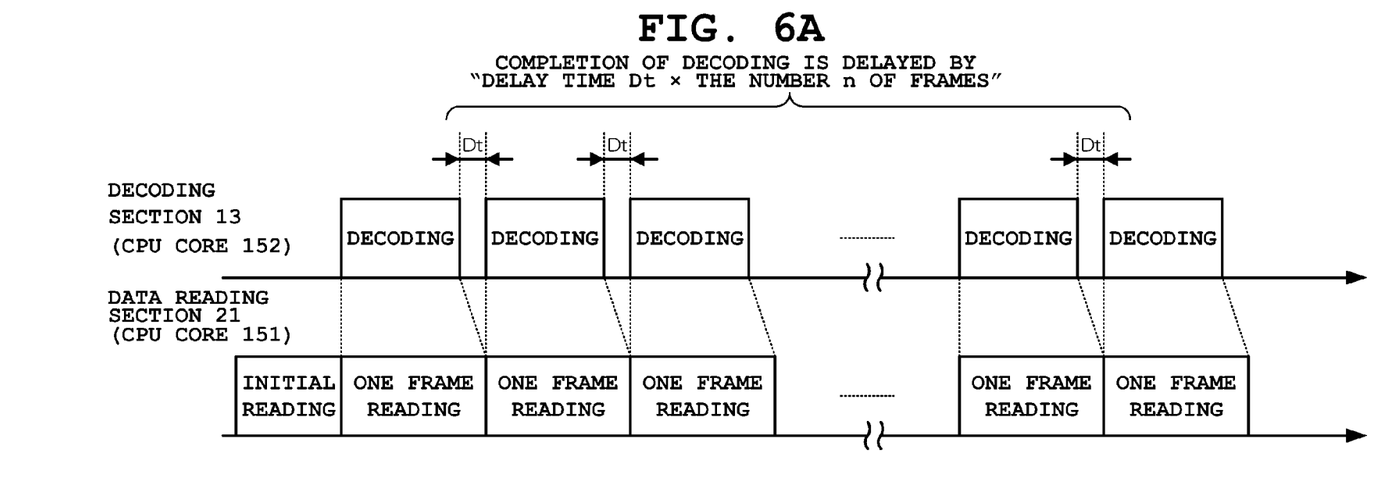
FIGS. 6A and 6B are timing charts to describe the buffering operation of the moving image data of the electronic apparatus 1 of the present embodiment.
Figure 6B:
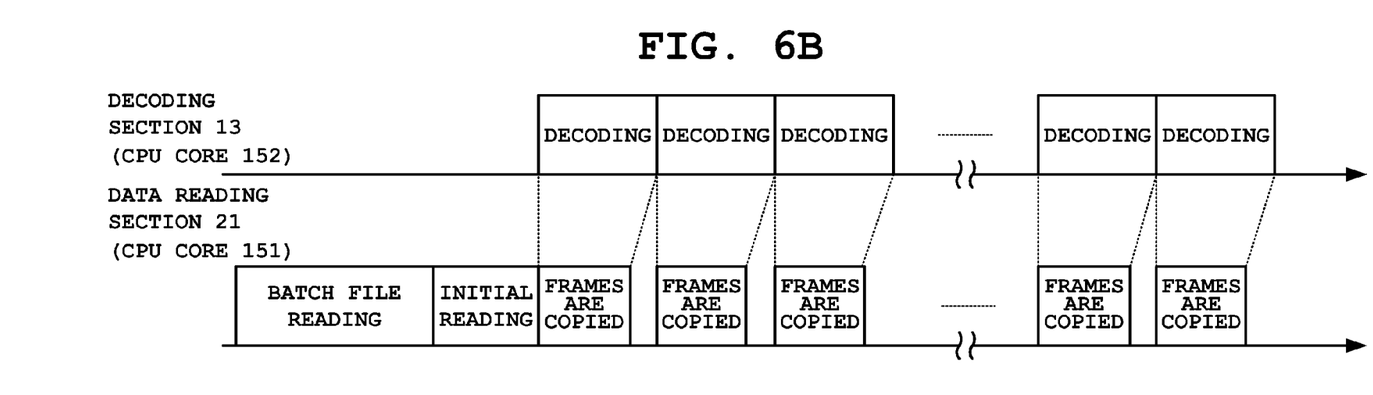

Next, the operations of the aforementioned embodiment will be described. FIGS. 3 and 4 are flowcharts to describe the operations of the electronic apparatus 1 of the present embodiment. Also, FIGS. 5 and 6 are timing charts to describe an operation of buffering moving image data in the electronic apparatus 1 of the present embodiment.

When the playback of moving image data is instructed by a user, the control section (CPU) 15 executes buffering initialization processing such as setting for the number of remaining decoding frames described later (Step S10). Subsequently, the control section (CPU) 15 judges whether or not the decoding time T1 is longer than the moving-image-data reading time T2 (Step S12). When the decoding time T1 is longer than the moving-image-data reading time T2 (Step S12, YES), the control section (CPU) 15 executes loop processing at Steps S14 to S26. This loop processing at Steps S14 to S26 corresponds to the aforementioned first buffering method.

First, the data reading section 20 (CPU core 151) reads out the moving image data in units of one frame from an external storage medium inserted into the external storage medium insertion section 16 and sequentially stores the moving image data in the decoding buffer section 142 (Step S16). In parallel to this, the decoding section 13 (CPU core 152) reads out the moving image data in units of one frame from the decoding buffer section 142, decodes the moving image data (Step S18), and sequentially stores the moving image data in the display data buffer section 144 (Step S20).

Subsequently, the control section (CPU) 15 subtracts one from the number of remaining decoding frames that have not been decoded (Step S22), and judges whether or not the number of the remaining decoding frames has reached zero (Step S24). Then, when the number of the remaining decoding frames is not zero, that is, when the frames to be decoded are still remained (Step S24, NO), the control section (CPU) 15 returns to Step S16. Hereafter, until the number of the remaining decoding frames reaches zero, the control section (CPU) 15 repeats the aforementioned processing. When the number of the remaining decoding frames reaches zero (Step S24, YES), the loop processing is finished (Step S26), and the control section (CPU) 15 completes the processing.

FIG. 5 illustrates the operation of the aforementioned first buffering method. As illustrated, in the first buffering method, after the initial reading of the moving image data from the external storage medium inserted into the external storage medium insertion section 16, the data reading section 20 (CPU core 151) sequentially reads out the moving image data in units of one frame and stores the moving image data in the decoding buffer section 142. In parallel to this, the decoding section 13 (CPU core 152) reads out the moving image data in units of one frame from the decoding buffer section 142, decodes the moving image data, and sequentially stores the moving image data in the display data buffer section 144.

As such, when the decoding time T1 is longer than the moving-image-data reading time T2, the moving-image-data reading processing is faster than the decoding processing. Accordingly, even when the moving image data is decoded while being read for every one frame, the decoding can successively be executed by selecting the first buffering method without waiting for the completion of reading the moving image data. Accordingly, the decoding can be completed in the shortest time, and the buffering can be completed in the shortest time, whereby the waiting time from the playback instruction to the start of the playback can be shortened.

Conversely, when the decoding time T1 is shorter than the moving-image-data reading time T2 (Step S12, NO), the control section (CPU) 15 judges whether or not the time T4 (the number n of remaining decoding frames×Time T2) is longer than the time T5 (the number n of remaining decoding frames×Time T1+Time T3) (Step S30). Note that the number n of remaining decoding frames prior to the decoding corresponds to the total number of frames of the moving image data.

At the aforementioned Step S30, the control section (CPU) 15 judges whether or not the batch reading time T3 is short enough to absorb the waiting time regarding the aforementioned decoding. That is, if the time T4 is longer than the time T5, the decoding can be completed in a short period of time by selecting the second buffering method in which the moving image data is collectively read out and decoded while internally being copied for every one frame.

Here, when the time T4 is longer than the time T5 (Step S30, YES), the file batch reading section 21 (CPU core 151) reads out the moving image data (of a predetermined size=corresponding buffer size) collectively in units of block (in units of page) from the external storage medium inserted into the external storage medium insertion section 16 and stores the moving image data in the batch reading file storage section 143 (Step S32). Subsequently, the control section (CPU) 15 executes loop processing at Steps S34 to S48. This loop processing at Steps S34 to S48 corresponds to the aforementioned second buffering method.

First, the control section (CPU) 15 sequentially and directly transfers (copies)) the moving image data in units of one frame from the batch reading file storage section 143 to the decoding buffer section 142 by means of copying based on DMA (Step S36). In parallel to this, the decoding section 13 (CPU core 152) reads out the moving image data in units of one frame from the decoding buffer section 142, decodes the moving image data (Step S38), and sequentially stores the decoded moving image data in the display data buffer section 144 (Step S40).

Subsequently, the control section (CPU) 15 subtracts one from the number of remaining decoding frames (Step S42) and judges whether or not the number of the remaining decoding frames has reached zero (Step S44). Then, when the number of the remaining decoding frames is not zero, that is, when the frames to be decoded are still remained (Step S44, NO), the control section (CPU) 15 judges whether or not there is a next frame in the batch reading file storage section 143 (Step S46). That is, the control section (CPU) 15 judges whether or not there remains moving image data that has not been collectively read out in batch reading file storage section 143. Then, when there is a next frame in the batch reading file storage section 143 (Step S46, NO), the control section (CPU) 15 returns to Step S36 and repeats the aforementioned processing.

FIG. 6A illustrates the buffering operation of a case where, when the decoding time T1 is shorter than the moving-image-data reading time T2 (Step S12, NO) the aforementioned first buffering method is applied. In contrast, FIG. 6B similarly illustrates the buffering operation of a case where, when the decoding time T1 is shorter than the moving-image-data reading time T2 (Step S12, NO), the aforementioned second buffering method is applied.

As illustrated in FIG. 6A, if the first buffering method is applied, after the initial reading of the moving image data from the external storage medium inserted into the external storage medium insertion section 16, the data reading section 20 (CPU core 151) sequentially reads the moving image data in units of one frame and sequentially stores the moving image data in the decoding buffer section 142. In parallel to this, when the decoding section 13 (CPU core 152) reads and decodes the moving image data in units of one frame from the decoding buffer section 142, there occurs a waiting time Dt during the decoding processing because the decoding time T1 is shorter than the moving-image-data reading time T2. As a result, delay occurs which is represented by "the number of entire decoding frames×the waiting time Dt" before the decoding is completed.

In contrast, if the second buffering method is applied as illustrated in FIG. 6B, after reading out the moving image data collectively in units of block (in units of page) from the external storage medium inserted into the external storage medium insertion section 16 and storing the moving image data in the batch reading file storage section 143, the file batch reading section 21 (CPU core 151) carries out the initial reading, and the decoding section 13 (CPU core 152) decodes and sequentially stores the moving image data in the display data buffer section 144 while the file batch reading section 21 (CPU core 151) copies the moving image data in units of one frame based on DMA from the batch reading file storage section 143 to the decoding buffer section 142.

As such, when the decoding time T1 is shorter than the moving-image-data reading time T2 and the time T4 is longer than the time T5, the successive decoding can be executed by selecting the second buffering method without waiting for the completion of the reading of the moving image data. Accordingly, the decoding can be completed in the shortest time, and the buffering can be completed in the shortest time, whereby the waiting time from the playback instruction to the start of the playback can be shortened.

In contrast, in the loop processing at Steps S34 to S48 in FIG. 4, when the number of the remaining decoding frames is not zero (Step S44, NO) and the next frame does not exist in the batch reading file storage section 143 (Step S46, YES), the control section (CPU) 15 returns to Step S30 and continues the processing with respect to the remaining frames that have not been collectively read. That is, there is a case where the moving image data cannot be collectively read, which is attributed to the size and playback time of the moving image data or the buffer size of the batch reading file storage section 143. Accordingly, it is necessary for the control section (CPU) 15 to again judge whether or not the first buffering method is applied or the second buffering method is applied, with respect to the remaining moving image data.

Here, when the time T4 is longer than the time T5 with respect to the remaining moving image data (Step S30, YES), the aforementioned second buffering method can be applied. In contrast, when the time T4 is shorter than the time T5 with respect to the remaining moving image data (Step S30, NO), the control section (CPU) 15 returns to Step S14 in FIG. 3, and the first buffering method is applied.

Then, when the number of the remaining decoding frames reaches zero (Step S44, YES), the control section (CPU) 15 completes the aforementioned processing.

According to the aforementioned embodiment of the present invention, even when the speed of reading out data from an external storage medium and the decoding speed are changed, performance at the time of the playback of the moving image can fully be exerted by a more appropriate buffering method being selectively applied in accordance with the speed of reading out the data from the external storage medium and the decoding speed. As a result, the buffering of the moving image data at the time of the playback of the moving image can be completed in the short period of time, whereby the waiting time from the playback instruction to the start of the playback can be shortened.

In the aforementioned embodiment, the electronic apparatus including the function for replaying moving images has been described. However, more specifically, the present embodiments can be applied to electronic apparatuses such as portable phones with a camera function, smart phones, tablet terminals, and the like, in addition to digital cameras.

While the present invention has been described with reference to the preferred embodiments, it is intended that the invention be not limited by any of the details of the description therein but includes all the embodiments which fall within the scope of the appended claims.

What is claimed is:

1. An electronic apparatus comprising:
   a reading section which reads moving image data stored in an external storage medium by one of a plurality of reading methods;
   a decoding section which decodes the moving image data read by the reading section;
   an identifying section which identifies a decoding speed at which the moving image data is decoded by the decoding section and a reading speed at which the moving image data is read by the reading section; and
   a selecting section which selects a reading method that is used when the reading section reads the moving image data, based on whether the decoding speed and the reading speed identified by the identifying section are in a predetermined relationship;
   wherein:
   the reading section reads the moving image data by one of (i) a first reading method in which the moving image data stored in the external storage medium is read in predetermined units, and (ii) a second reading method in which the moving image data stored in the external storage medium is collectively read in a plurality of predetermined units;
   the decoding section sequentially decodes the moving image data read by the reading section in the predetermined units;
   the identifying section identifies the decoding speed at which the moving image data is decoded by the decoding section, a first reading speed at which the moving image data is read by the reading section with use of the first reading method, and a second reading speed at which the moving image data is read by the reading section with use of the second reading method; and the selecting section selects one of the first reading method and the second reading method as the reading method that is used when the reading section reads the moving image data, based on whether the decoding speed, the first reading speed, and the second reading speed identified by the identifying section are in a predetermined relationship.

2. The electronic apparatus according to claim 1, wherein the identifying section identifies the decoding speed or the reading speed which changes in accordance with a difference in at least one of conditions including a recording status of the moving image data to be replayed, a playback condition of the moving image data, and a type of the external storage medium.

3. The electronic apparatus according to claim 1, further comprising:
a batch reading file storage section which stores the moving image data in the plurality of predetermined units collectively read by the reading section with use of the second reading method; and
a control section which controls a buffering operation by one of a first buffering method in which the moving image data is sequentially read out in frame units from the external storage medium by the reading section, and the sequentially read out moving image data is sequentially decoded in frame units by the decoding section, and a second buffering method in which the moving image data in the plurality of predetermined units collectively read out from the external storage medium by the reading section with use of the second reading method is stored in the batch reading file storage section, and then the moving image data stored in the batch reading file storage section is decoded in order in frame units by the decoding section.

4. The electronic apparatus according to claim 3, wherein the control section selects one of the first buffering method and the second buffering method based on the decoding speed at which the moving image data is decoded in frame units by the decoding section and the reading speed at which the moving image data is read out in frame units from the external storage medium by the reading section.

5. The electronic apparatus according to claim 4, wherein the control section selects the first buffering method when the decoding speed of the decoding section is slower than the first reading speed of the reading section, and selects the second buffering method when the decoding speed of the decoding section is faster than the first reading speed of the reading section.

6. The electronic apparatus according to claim 3, further comprising:
a decoding buffer section which temporarily retains the moving image data in frame units immediately before being decoded by the decoding section,
wherein the moving image data stored in the batch reading file storage section is directly transferred in frame units to the decoding buffer section, when the second buffering method is applied.

7. The electronic apparatus according to claim 3, wherein the control section applies the second buffering method when a first reading time during which the moving image data is read by the reading section with use of the first reading method is longer than a time acquired by adding a decoding time during which the moving image data is decoded by the decoding section to a second reading time during which the moving image data is read by the reading section with use of the second reading method.

8. The electronic apparatus according to claim 1, wherein the reading section and the decoding section are respectively actualized by a central processing unit mounted with a plurality of processor cores capable of performing simultaneous processing in parallel.

9. The electronic apparatus according to claim 1, further comprising:
a display section; and
a display control section which displays the moving image data decoded by the decoding section on the display section.

10. A decoding method comprising:
a reading step of reading moving image data stored in an external storage medium by one of a plurality of reading methods;
a decoding step of decoding the moving image data read in the reading step;
an identifying step of identifying a decoding speed at which the moving image data is decoded in the decoding step and a reading speed at which the moving image data is read in the reading step; and
a selecting step of selecting a reading method that is used when the moving image data is read in the reading step, based on whether the decoding speed and the reading speed identified in the identifying step are in a predetermined relationship;
wherein:
in the reading step, the moving image data is read by one of (i) a first reading method in which the moving image data stored in the external storage medium is read in predetermined units, and (ii) a second reading method in which the moving image data stored in the external storage medium is collectively read in a plurality of predetermined units;
the decoding step sequentially decodes the moving image data read in the reading step in the predetermined units;
the identifying step identifies the decoding speed at which the moving image data is decoded in the decoding step, a first reading speed at which the moving image data is read in the reading step with use of the first reading method, and a second reading speed at which the moving image data is read in the reading step with use of the second reading method; and
the selecting step selects one of the first reading method and the second reading method as the reading method that is used when the reading step reads the moving image data, based on whether the decoding speed, the first reading speed, and the second reading speed identified in the identifying step are in a predetermined relationship.

11. A non-transitory computer-readable storage medium having stored thereon a program that is executable by a computer in an electronic apparatus, the program being executable by the computer to perform functions comprising:
read processing for reading moving image data stored in an external storage medium by one of a plurality of reading methods;
decode processing for decoding the moving image data read by the read processing;
identification processing for identifying a decoding speed at which the moving image data is decoded by the decode processing and a reading speed at which the moving image data is read by the read processing; and selection processing for selecting a reading method that is used when the moving image data is read by the read processing, based on whether the decoding speed and the reading speed identified by the identification processing are in a predetermined relationship;

wherein:

the read processing reads the moving image data by one of (i) a first reading method in which the moving image data stored in the external storage medium is read in predetermined units, and (ii) a second reading method in which the moving image data stored in the external storage medium is collectively read in a plurality of predetermined units;

the decode processing sequentially decodes the moving image data read by the read processing in the predetermined units;

the identification processing identifies the decoding speed at which the moving image data is decoded by the decode processing, a first reading speed at which the moving image data is read by the read processing with use of the first reading method, and a second reading speed at which the moving image data is read by the read processing with use of the second reading method; and the selection processing selects one of the first reading method and the second reading method as the reading method that is used when the read processing reads the moving image data, based on whether the decoding speed, the first reading speed, and the second reading speed identified by the identification processing are in a predetermined relationship.

\* \* \* \* \*